July 3, 1962  J. E. FOSTER  3,042,788
WELDING SYSTEM WITH SCANNING WELD CURRENT
Filed April 13, 1959  7 Sheets-Sheet 2

INVENTOR.

July 3, 1962 J. E. FOSTER 3,042,788
WELDING SYSTEM WITH SCANNING WELD CURRENT
Filed April 13, 1959 7 Sheets-Sheet 3

INVENTOR.
Julius E. Foster

July 3, 1962   J. E. FOSTER   3,042,788
WELDING SYSTEM WITH SCANNING WELD CURRENT
Filed April 13, 1959   7 Sheets-Sheet 6

INVENTOR.
Julius E. Foster

July 3, 1962 J. E. FOSTER 3,042,788
WELDING SYSTEM WITH SCANNING WELD CURRENT
Filed April 13, 1959 7 Sheets-Sheet 7

INVENTOR.

United States Patent Office 3,042,788
Patented July 3, 1962

3,042,788
WELDING SYSTEM WITH SCANNING WELD CURRENT
Julius E. Foster, 91 Mountain Way, Rutherford, N.J.
Filed Apr. 13, 1959, Ser. No. 806,074
20 Claims. (Cl. 219—67)

This invention relates to electric welding, and particularly to a process of welding control that is generally applicable to various welding operations, and that accomplishes the welding by causing the weld current stream section to scan the seam surfaces that are to be welded together.

Electric resistance welding consists generally in placing two metal elements together in surface-to-surface relation where the weld is to be established between those surfaces, and in then applying the welding current to the two elements in such manner that the current will pass between the contacting surfaces and establish sufficient heat at those surfaces to effect a weld at and between those surfaces.

This application is a continuation in part of my copending application filed December 23, 1953, Serial No. 399,942, relating to Welding Systems, now Patent No. 2,882,384, issued April 14, 1959.

In my co-pending application referred to above, application of a controlled welding system is illustrated as applied to the seam welding of thin tubing from strip, or to the welding of thick-walled pipe from skelp.

In the welding operation, whether thin-walled tubing or thick-walled pipe, the original strip or the original skelp is mechanically formed and shaped into a substantially cylindrical body with the two edges of the strip or skelp butting together where they are to be welded to form the finished tubing or pipe. The welding operation is accomplished by passing an electric current across the seam between two roller electrodes that roll along on both sides of the seam and as close to the seam as possible. The current stream between the electrodes thus crosses the seam laterally of the pipe length and is progressively shifted laterally relative to the pipe length as the pipe moves past and under the roller electrodes.

The material to be welded into a pipe is ferrous material, and is magnetic. Since it serves as a conductor of the electric welding current, it also provides a path of low magnetic reluctance to the magnetic field of that welding current. The effect of that magnetic relation on the location and form of the current stream has apparently been overlooked.

As pointed out in the co-pending application identified above, the magnetic flux field established by the stream of welding current tends to crowd itself into the magnetic material of the pipe, rather than follow the high reluctance path in the air. Consequently, the inwardly crowding magnetic flux tends to centralize the welding current stream section in the central seam areas along the median line of each butting seam surface. Thus, the welding current stream section is magnetically constrained inwardly from the longitudinal edges of the butting seam surfaces that are to be welded.

Consequently, the only metal that is heated at one seam surface and welded to the corresponding area of the butting surface in the seam, is located mainly along the longitudinal median line of each of the abutting seam surfaces.

The high magnetic permetability of the ferrous metal, relative to the permeability of the air, presents a path of low reluctance to the magnetic flux field that surrounds the welding current stream section, compared to the reluctance through the adjacent air path. The magnetic flux field that surrounds the welding current stream section, seeks the path of lower reluctance, and positions itself mainly in the metal, with the consequent restriction of the weld current stream section to the intermediate median region of each of the two seam surfaces that are to be welded.

The tensile force established by the magnetic field surrounding the welding current stream is sufficient, under such conditions, both to confine the welding current stream section to the median line in the seam areas, and also to squeeze and deform the current stream section into a relatively oval current stream section, under certain dimensional condiitons.

Consequently, where the wall of the pipe to be welded was relatively thick, it was wider than the compressed width of the welding current stream section. The resulting width of the effective weld spot, established by the narrowed welding current section, was less than the thickness of the pipe, which corresponded to the width of the seam surface areas. Thus, a narrow region of the seam surface area along each edge of the two butted seam surfaces remainined unwelded. Consequently, the weld did not extend from edge to edge on the two contacting butting seam surface areas. Instead, only the middle or median zones of the surface areas were welded. The seam edges longitudinally of the pipe seam areas remained unwelded beyond the line edges of the welded medial regions.

Those inner and outer line edges of the seam weld are stress concentration lines. When the pipe is subjected to extra tensile stresses due to the pipe becoming heated by ambient conditions before being placed in service, or due to pressures generated during operation, those stress concentration lines concentrate the stress forces and generate very steep stress gradients. As a result of such concentrated stresses, even the relatively good welds at the middle of the seam areas are weakened and opened.

Only by the eliminating or obviating of such stress concentration zones in such a welded seam, can a completely safe weld be assured.

Such stress concentration regions along the two edges of the seam can be readily prevented by causing the weld in the first instance to be established across the entire weld surface areas of the two abutting edges of the pipe.

A primary object of this invention is therefore to provide a welding process that will assure the complete welding of the entire surface areas of two abutting seam surface edges of a pipe section.

Another object of this invention is to provide a method and apparatus for controlling a welding current that crosses a seam between the two engaging seam surfaces, to cause that welding current to scan entirely the two surface areas presented at the seam, so that the weld shall be established over the entire seam surface, with none of the seam surface areas left unwelded and promoting formation of a stress concentration zone at the edge of each unwelded zone.

In view of the tendency of the magnetic flux field of the welding current stream to stay within the body of the ferrous pipe material, and thereby restrict and centralize the position of the welding current stream to the median zone of the welding seam surfaces, it is necessary to overcome that strong centralizing effect of the magnetic flux field, in order to be able to shift the welding current stream section to both edges of the seam surface areas.

In the performance of the method as disclosed in the prior co-pending application, and as now further developed in this application, an external magnetic field is generated adjacent the welding region defined by the path of the welding current stream. That external control field is utilized to overcome the centralizing tendency of the welding current flux field. The control field is caused to force the welding current stream section selectively and alternately to each edge of the seam surface areas for controlled time intervals.

Co-operatively with the action for laterally shifting the welding current stream alternately to either edge of the seam surface, a second external magnetic field force is established and employed to selectively shift the welding current stream alternately in each direction, lengthwise of the seam surfaces.

In that manner the welding current stream section is controlled to be shifted radially, either to the inner edge of each of the seam surfaces or to the outer edge of each of the seam surfaces, and, while located at one edge of those surfaces, the welding current is controlled to be shifted back or forth longitudinally along that edge, as well as along the normal median path of the surfaces. Thus the entire areas of the two abutting surfaces at the seam will be traversed and heated by the welding current stream, and the metal at those areas will be caused to coalesce and weld together over their entire surface areas. No clefts will be left, because of unwelded areas, that would define and establish stress concentration zones.

In the prior co-pending application, electro-magnetic means are illustrated for establishing both types of forces, to move the welding current stream radially inward or outward relative to the pipe axis, and also to move the current stream backward or forward longitudinally along the seam edges parallel to the pipe axis, to establish an effective scanning action of the welding current stream section over the seam surfaces.

In this application, the same general principle of electro-magnetic control is employed to establish the scanning control effect, by the external magnetic forces, to move the welding current stream to cause the current stream section to cover the entire surface area of the abutting seam surfaces.

In a large welding machine that is employed to progressively weld a pipe blank of large diameter, and substantial thickness, it is necessary that certain pressure rolls and the welding current electrodes be located at the immediate vicinity of the welding zone. In order to permit maximum flexibility in the design and disposition of those features of mechanical construction in the welding machine, it is preferable that the electro-magnetic controls of this invention, that are to shift the welding current, be located where those controls will not impose any restrictions upon the flexibility of design in locating the pressure rolls and the current-conducting electrodes.

Moreover, in large welding machines now in service, the application of this invention should be attended by a minimum of change in the structure or conventional method of operation of the welding machine.

Since the space in a pipe of large diameter is considerable, that space provides room in which to locate such electro-magnetic controls. Those controls may thus be disposed immediately adjacent the welding zone where they are to be effective, even though on the opposite side of the pipe wall sections from the location of the current-supplying electrodes, and without otherwise affecting the design or operation of the welding machine. The location of the electrodes and their normal manner of operation are thus unaffected by the application of this invention to a conventional welding machine.

A particular feature of this invention is that it permits the electro-magnetic controls to be disposed in such a space that is otherwise not used, namely within the pipe that is being welded. Even though the controls are disposed on the other side of the pipe wall from the point of application of the welding current, the controls are still immediately adjacent the welding zone and fully effective. Thereby the electro-magnetic fields established by the electro-magnetic controls can be made to selectively control and move the welding current stream section to cause the weld current to scan, and thus to heat and weld, the entire surface areas at the seam, without interfering with the location or operation of the regular electrodes or other parts of the old or new welding machine.

Another object of this invention, therefore, is to provide a welding system that may be easily and readily adapted to presently existing installations of large welding machinery, with a very simple application of control equipment, that will not require any modification or change in the construction and method of operation of the major components of such existing machinery.

In order to establish the welding effect over the entire seam surface areas, it is necessary to perform what is essentially a scanning movement of and by the welding current stream section. As previously indicated, the current stream section must be moved radially inward and outward on the seam areas where the pipe is being welded, and also longitudinally back and forth along those seam areas, to enable the scanning action to cover the entire surface areas to be welded.

The radial, or up-or-down, movement of the current stream is accomplished by a magnet that sets up a longitudinal field in the seam side portions of the pipe, and that is therefore transverse to the welding current stream path across the seam.

The longitudinal movement of the current stream back and forth in the welding region is controlled and effected, in this application, by two separate travelling electro-magnetic fields, that are separately generated and caused to move in opposite directions at the welding region. Those two fields serve to shift the welding current stream in those same respective directions in which each of the respective fields travels.

These two types of electro-magnetic controls, that is, the radial shift and the longitudinal shift controls, may be utilized to shift the welding current stream in any pre-determined pattern that will serve ultimately to cause the current stream to scan and cover the entire surface areas that are to be welded at the seam.

For the purpose of illustration, one path of movement of the welding current is illustrated which serves to weld the entire surface areas of engagement at the seam. Obviously, with the types of control herein disclosed and illustrated, various paths or patterns of movement may be pre-determined to control and to guide the welding current stream section in its movement over the surfaces at the seam, to establish the final and complete welding action over the entire surface areas.

In order to establish the two oppositely moving travelling electro-magnetic fields that cause the welding current to shift longitudinally in the seam, a separate dynamo-electric motor-type core structure is employed to establish each of the two travelling magnetic fields. Each core structure is in effect a motor stator with a multi-phase winding on its outer periphery. When the multi-phase winding is properly energized from a corresponding multi-phase source, the stator windings on each core will set up a travelling magnetic field that will travel peripherally around the stator core.

By suitably arranging the windings on the two stator cores, and by suitably energizing those windings, the two travelling magnetic fields may be caused to move in opposite directions. Those two oppositely travelling fields may be further controlled to move alternately and sequentially, through a pre-determined distance or space in the welding region, in such manner as to cause the weld current to traverse the portions of the pipe seam that are progressively moving through the welding region.

Thus, one travelling field will move the welding current forward in one direction, to make the weld current scan and traverse a selected length of the pipe in the weld zone, and then the other travelling magnetic field will be brought into operation at the proper time and location to act on the welding current stream to move that stream backward to its initial location, or to some other desired location, on the pipe section in the weld zone.

In this manner, the two travelling fields are controlled to be oppositely effective in direction, and alternately effective in time, and they co-operate to move the welding current stream back and forth, to traverse a selected path, on the seam surfaces in the weld region.

Another object of the invention is to provide a welding system wherein the welding is effected primarily by electro-thermal action, and with smaller mechanical pressures than heretofore considered necessary.

Another object of this invention is to provide a welding method that is relatively rapid in its heat-generating effect and in its welding effect, and that tends to restrict the heat generation to a thin layer of metal immediately adjacent the seam surface, and that limits the duration of heat generation to a very short time interval, with the consequence that the welding heat does not have time to penetrate deeply into the body of the pipe adjacent the welding seam.

Moreover, the generation of the heating effect in a shallow depth, with rapid cooling, permits the rapid application of greater heating quantities of energy to cause actual fusion of the shallow surface layer depth, with the benefit of the subsequent immediate rapid cooling by the large adjacent body of metal when the quick heating impulse is terminated. The fused metal, on both surfaces of the seam cleft, intermingles and interfuses to establish optimum condition for a perfect fusion weld, upon cooling.

The fast fusion and fast cooling co-operate to form a fine-grained crystalline structure of great strength over the entire cleft seam surface areas, for a perfect edge-to-edge weld.

The rapid heating and rapid cooling are results of the fast scanning action by which the weld current sweeps over the seam surface areas.

The restriction of the heating effect to a shallow depth under those seam surface areas, by this process, is the result of holding those seam surfaces in contact with relatively low pressure forces, so the effective resistance across the discontinuity of the cleft, between the seam surfaces, is a multiple of the relative resistivity of the metal through a continuous portion of the metal body.

The energy dissipated as useful welding heat in the high resistance of the cleft region is many times the energy dissipated in a continuous portion of the metal body, due to the greater voltage drop in the increased resistance at the cleft, since the welding energy is $E^2/R$, where E is the voltage drop across the cleft and R is the resistance across the cleft.

Another feature and advantage of this rapid heating method with its correspondingly rapid cooling, due to the fast traverse of the welding current stream, is that the rapid cooling arrests any tendency for carbon to precipitate out of solution in the pipe body sections along the welding seam.

One form of heavy duty machine for electrically welding large size heavy walled pipe, with a wall thickness of 9/16 of an inch or more, and with a diameter of as much as sixteen inches or more, is shown in U.S. Patent No. 1,982,415, issued Nov. 27, 1934, to H. G. Blevins, and assigned to Republic Steel Corporation.

By disposing the electro-magnetic control equipment within a pipe that is being welded on such a machine, and adjacent the welding zone at the welding neck of the machine, the construction and the general operation of the machine itself are unaffected, since the operation of the control equipment is designed to be entirely effective from the otherwise unused space within the pipe that is passing through the throat of the machine.

In order to locate the electro-magnetic control equipment in proper position, adjacent the welding zone of the machine, such control equipment is suitably supported on a carriage that is disposed and equipped to ride in the internal space of a pipe blank that is passing through the welding neck of the machine. The carriage may be adjustably controlled and positioned from outside the pipe blank, to locate and position the electromagnetic control equipment at proper position for optimum effect on the welding current stream through the seam surfaces of the pipe blank as they pass through the welding zone.

Another object of this invention is to provide a welding system for easily and readily welding bi-metallic pipes, where the pipe contains two metals of different resistances. Such simplified system results from the continuous and instantaneous spot control of the scanning action over the engaging surfaces to be welded.

Other features and advantages of the invention and system disclosed herein will be referred to and pointed out in the following specification.

The manner in which the invention functions for welding thin-wall and thick-wall pipe, and the manner in which the invention may be applied to a heavy-duty machine for welding thick-wall pipe, are illustrated in the accompanying drawings in which.

FIGURE 4 is a plan view of the seam.

FIGURES 24 to 27, inclusive, are schematic views illustrating the progressive effects of the control flux set up by the control current upon the welding current stream during the positive wave of the welding current, in the system of FIGURE 23.

Figure 1:
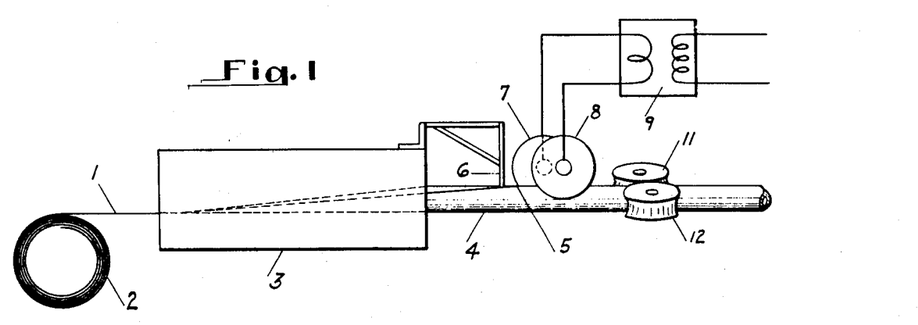
FIGURE 1 is a schematic view illustrating the layout of a welding system for tubes made from strip metal.

As illustrated in FIGURE 1, a system for forming tubes from strip material, by shaping the strip into cylindrical form and then welding the strip edges along the seam thus formed, comprises generally suitable mechanism for supplying strip material 1 from a reel 2 to a forming machine 3, to form the strip into a cylinder 4 with the outer edges contacting along a seam 5, which is guided by a suitable guiding finger 6 to guide the cylinder 4 between two electrodes 7 and 8, to permit a welding current derived from a welding transformer 9 to be supplied to the cylindrical tube 4 across the seam 5 to generate sufficient heat in the seam to effect a welding between the engaging seam edges. The seam edges are held in close contact by two pressure rollers 11 and 12 to hold the welded edges together until the heated metal of the seam can cool and solidify to hold the tube closed, after passing out of the weld zone between the electrodes.

Figure 2:
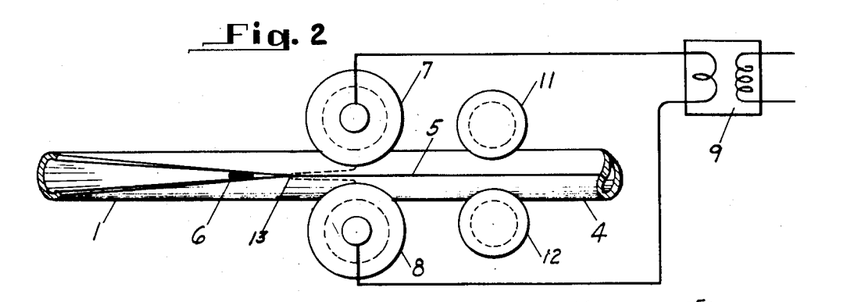
FIGURE 2 is a partial schematic plan view of a tube welding system, illustrating the disposition of the current supplying electrodes adjacent the seam cleft, and the side-pressure rolls behind the electrode rolls.

As shown in FIGURE 2, the strip 1, when formed into a cylinder, makes the first contact between the side edge surfaces at a point that constitutes a cleft 13, intermediate the guide finger 6 and the plane through the electrodes. The guide finger is preferably of the nature of a file to clean the edge surfaces of the strip by removing any rust or dirt adhereing to those surfaces.

Figure 3:
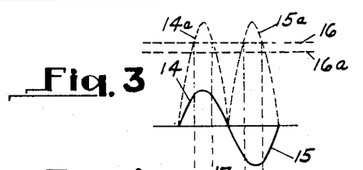
FIGURE 3 is a graph of one cycle of an alternating weld current sine wave.
Figure 4:
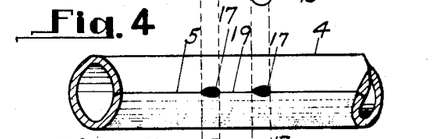
Figure 5:
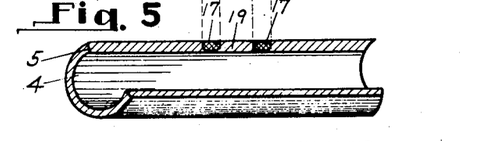
FIGURE 5 is a vertical sectional view along the seam, with both views related to the current wave cycle of FIGURE 3, when the welding is done at a high rate of speed, sufficiently fast to separate the successive weld spots in the seam.

In FIGURES 3, 4, and 5, is illustrated, generally, a relationship between the two waves 14 and 15 of a weld current cycle and the weld spots produced thereby. The current waves 14 and 15 are of opposite polarity, but their heat effects represented by wave impulses 14–a and 15–a have no polarity characteristics.

The effective value of a sine wave is approximately seven-tenths of the maximum peak value. The heat effect is therefore represented by a value below the peak value, and, for satisfactory welding operation, the heating effect or heating value of an alternating current should be sufficient to melt the metal in a thin layer on the edge surfaces to form a weld seam between those surfaces.

As schematically shown in FIGURE 3, the heat impulses 14–a and 15–a have effective heating values measured by the height of dot and dash line 16 above the zero or base line. Broken line 16–a schematically represents the amount of heat necessary to establish a melting of the seam edge surfaces for the welding action.

If the heating effect of the heat impulses 14–a and 15–a reaches the value represented by line 16–a, a spot of metal will be affected at the seam, on both surfaces, and will form a weld spot 17 in the seam, as in FIGURE 5, which will look like the tapered spot shown in FIGURE 4. Relatively the formation and the location of the weld spots 17 will be governed by the time and place occurrence when the heat impulses establish the effective heat values that are at least equal to the melt values represented by line 16–a.

If the metal tube is kept stationary, the heat impulses will pile up on one spot at the seam. If the tube is moved past the electrodes, while current flows between the electrodes, the locations of the spots will be controlled according to the times when the heat impulses reach their effective values. If the speed of movement of the tube is high, the weld spots 17 may be separated, as shown in FIGURES 4 and 5. The spaces 19 along the seam, between the weld spots 17, will be unwelded, and will open sufficiently, under excess internal pressure, to permit leakage through the seams at those points.

Figure 6:
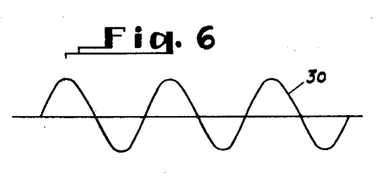
FIGURE 6 is a graph of a sine wave representing the weld current.
Figure 7:
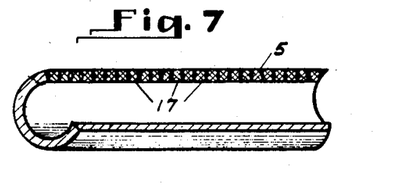
FIGURE 7 is a view of a seam surface similar to that in FIGURE 5, with the welding done at a speed sufficiently low to permit the welded spots to overlap, to establish a continuous weld along the seam.

If the speed is slower, the current waves of the welding current, shown in FIGURE 6, will establish closely disposed weld spots 17, as in FIGURE 7, that will overlap sufficiently to establish a continuous weld along the seam.

In resistance welding, the pressure between the edge surfaces at the seam is an important factor in controlling the heat development in the seam.

The amount of heat that is generated in the weld, directly at the contacting edge surfaces, can be controlled by varying the pressure between the contacting seam edges. The reason therefor becomes clear upon consideration of Ohm's law. The energy at the weld is the product of the weld current I and the voltage drop E, or $IE$. The voltage drop E, in turn, is the product of the current I and the resistance R, between the edges at the seam, or $IR$. The energy is therefore represented by the well-known expression $I^2R$. The heat developed in the seam is therefore proportional to the resistance of the contact between the seam edges.

If the contact pressure between the edges at the seam is high, the resistance will be low, and the amount of heat generated in the seam will be small. Conversely, if the contact pressure is low between the edges at the seam, the resistance will be high and the amount of heat developed in the seam will be large. Thus, the heat in the weld can be inversely controlled by the pressure at the weld, for the same current value.

Figure 8:
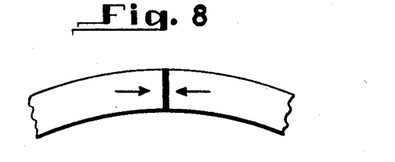
FIGURES 8 and 9 illustrate the relationship between high pressure at the seam surfaces and the resulting heating effect in the seam, between the surfaces.
Figure 9:
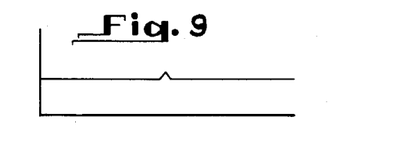
Figure 10:
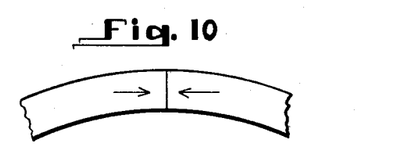
FIGURES 10 and 11 illustrate the relationship between low pressure at the seam surfaces and the resultant heating effect between the surfaces.
Figure 11:
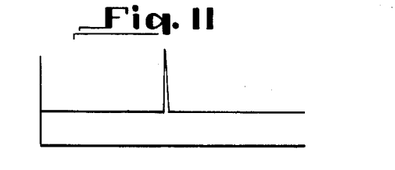

Therefore, where the pressure is high and the resistance low, as in FIGURE 8, the heat developed is low, as shown in FIGURE 9. And where the pressure is low, as in FIGURE 10, the resistance is high and the heat is high, as in FIGURE 11.

Thus, for the same value of weld current, the heating effect may be high or low, depending upon the contact pressure at the seam edges. If that pressure is kept constant, however, the heat effect will vary as the square of the current.

Where such pressure was maintained constant, as in the manner heretofore practiced, the amount of current that could be applied to the seam was limited to a quantity that would not generate sufficient heat at each weld spot to cause the metal to drop out.

The quantity of current that could be safely applied to the seam was also governed by the speed of movement of the tube through the weld zone and past the welding electrodes. A fast moving tube could safely receive more current in the seam than a slow moving tube, since the heating effect would be more distributed in the fast moving tube, and the tube would be cooled faster.

A particular advantage of high speed welding is that the change in the metallurgical structure of the metal at the seam edges is reduced to a minimum. Thus, in the welding of steel, even with a high carbon content, a high speed in the welding action permits only a small change in the carbon distribution, and does not appreciably withdraw the carbon from its solid solution in the metal, along the seam, as is permitted by slow welding, where sufficient time is available for extensive metallurgical redisposition in response to the generated heat impulse of the weld current.

That desirable feature of maintaining the original metallurgical structure is substantially achievable with high speed welding, and is one of the advantages achieved by this present system.

With welding current of standard commercial frequency of sixty cycles, the heating time, measured by the time of contact between the electrodes and the metal being welded, is relatively short. If that time could be diminished still further, while effecting a complete weld, however, there would be still less time for change of metallurgical structure in response to the welding heat impulses, and any such tendency would be arrested that much more quickly.

If the frequency of the welding current were increased, higher welding speed would appear theoretically possible. The reactance, or electrical impedance, of the system would be so increased, however, that the current value could not be sufficiently increased to provide a current impulse with sufficient heat generating content to effect a weld.

Similarly, with current of standard commercial frequency of sixty cycles, the successive weld spots 17 as formed in a progressive welding operation, are spaced from each other, as indicated in FIGURE 5. The metal zones 19 between those weld spots 17 along the two edges at the seam, are not welded together.

Here, again, it would appear that the use of a current of higher frequency would serve to locate the weld spots closer together, and, therefore, cause them to be overlapping and continuous, to establish a continuous progressive weld along the seam.

But the higher frequency current is unsatisfactory for that purpose due to the increased impedance of the system to higher frequencies, as already explained.

Figure 12:
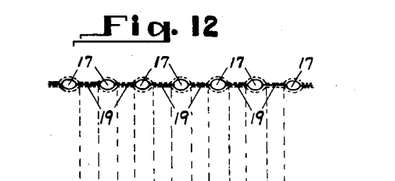
FIGURE 12 is a schematic illustration of a group of spaced welded spots along a seam.
Figure 13:
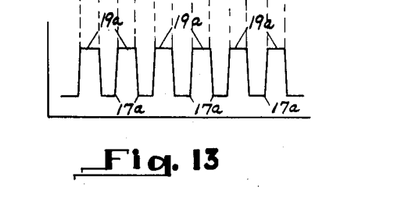
FIGURE 13 is a graph illustrating the resistance distribution, along the seam, with relation to the spaced welded spots of FIGURE 12.

During a welding operation at high speed, with the weld spots spaced from each other, as shown in FIGURE 12, the resistance along the weld is distributed as shown in FIGURE 13. Where the seam is welded at the spots 17, the resistance across the seam is small, as indicated by the bases 17-a of the graph of FIGURE 13. At the spaces 19 between the weld spots 17, the resistance across the seam is high, as indicated by the peaks 19-a in FIGURE 13.

As each current impulse, whether positive or negative, crosses the seam 5, the metal at the seam edges becomes heated. The manner in which the heated metal along the seam controls the weld current is shown in FIGURES 14, 15 and 16.

Figure 14:
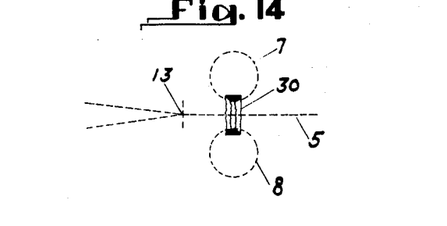
FIGURE 14 is a schematic view of a welding current stream between the electrodes at the beginning of a current wave impulse.
Figure 15:
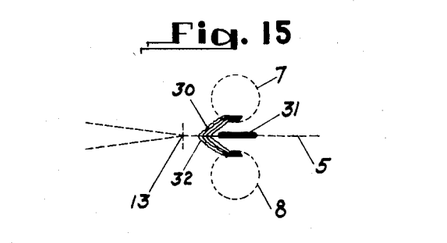
FIGURE 15 is a similar view showing the distribution of the current stream with respect to a heated seam zone after the beginning of the impulse.

As shown in FIGURE 14, a current impulse of weld current, represented by current streams, traverses the metal across the seam 5 as it passes between the two electrodes 7 and 8. The metal traversed by the current becomes heated and welded. While heated, its resistance is increased. So long as the heated metal, indicated by the dark section 31 (exaggerated for clearness) lies in the path between the electrodes 7 and 8, the current impulse, whether it is the one that heated that metal, or whether it is the impulse following the heating impulse, will shift to the left, to the cold metal of the seam, adjacent and behind the heated metal, as shown in FIGURE 15.

Figure 16:
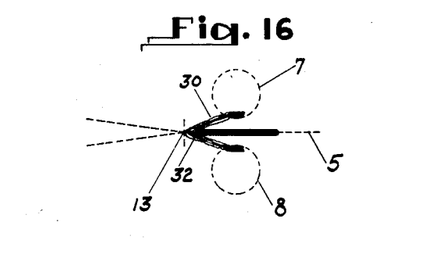
FIGURE 16 is a similar view illustrating the disposition of the current stream when shifted to its extreme left at the cleft, or initial point of contact between the seam edges.

As soon as the current stream 30 between the two electrodes is diverted from a direct straight-line path between the two electrodes 7 and 8, the electro-magnetic flux of the current stream itself acts upon the stream as a movable conductor and moves the V-point 32 of the current stream to the extreme possible left-hand position along the seam, to the place where the seam edges are initially engaged at the cleft 13, as indicated in FIGURE 16.

As the metal is progressively moved along between the electrodes, each current impulse is similarly moved to the cleft at the engaging seam edges, where the resistance between engaging edges of the seam is highest. The heating effect is therefore maximum at the cleft according to Ohm's law, as previously explained. It is this action which is utilized to advantage in this system of progressive resistance welding. The increased heating action at the cleft, due to the high resistance at that point, heats the contacting metal of the two edges at the seam to a temperature that melts the layers of metal on both contacting edges so the molten metal may coalesce to form the weld between the two engaging edges.

As the metal of the seam proceeds on its way, the heat of the seam edges is transmitted back into the body of the adjacent metal and dissipated, and the seam is rapidly cooled, and the coalesced weld spot solidified. The pressure rolls 11 and 12, shown in FIGURE 1, serve to hold the seam edges together long enough to permit the weld spot to solidify. To the extent that the heated tube may be expanded to a diameter somewhat slightly larger than the initial diameter, the pressure rolls maintain an increased reaction pressure on the seam of the tube being welded. The pressure rolls are adjustable, however, so the pressure may be varied under different welding conditions to establish optimum operation.

For many applications, where a tube is used for structural purposes, it is satisfactory to provide a tube whose seam is held closed, even through the weld spots are spaced as in FIGURES 5 and 12, and even though the seam is not continuously welded along its length.

For other applications, where the tube will be subjected to internal pressures, as in grease guns, for example, or where the tube is to serve as a conduit, the seam should be completely welded along it length. With welding methods heretofore available, such a continuous weld could be effected only by a slow welding operation, so that successive heat impulses would overlap. Such slower welding operation would produce less tubing per unit of time, and would not utilize the maximum capacity of the welding machine. Moreover, the slower welding operation retains the heated metal of the seam in the weld zone long enough to permit the original metallurgical structure of the metal at and along the seam to be modified by the heat of welding, and to segregate the elements of the metal from their normal proper disposition. The welding heat would not be dissipated quickly, at such slow speed, but would be transmitted to the metal in the side zones adjoining the seam and would heat that metal to a sufficient degree of softening to cause weakening of the metal along such side zones.

Thus, for a continuous seam weld, the welding operation of the prior art must be slow enough to permit weld spot overlapping, with the attendant disadvantages of overheating along the seam and of undesired metallurgical modification.

Higher speed of welding operation of the prior art results in a discontinuous weld. The use of high frequency current for more frequent and, hence, closer weld spots is not possible. The use of greater current quantities is impossible, according to prior art practices, because each current impulse would generate more localized concentrated heat than necessary merely for the welding operation, and would melt out enough metal from the seam to leave a hole through the wall of the welded tube, at the seam.

The method of the present invention, as herein disclosed, overcomes the various difficulties of the prior art, outlined above, and permits a continuous weld to be made at high speed with welding current of standard commercial frequency. An incidental advantage is the rapid cooling of the welded surfaces, with a retention of the original metallurgical structure and a confining of the weld action to the edge surfaces only of the metal at the seam. In order to establish the continuous weld, more heat is necessary. By this method, such increased quantity of current is supplied to the weld zone without overheating and without burning out the metal at the seam.

One form of a general welding system is shown in FIGURE 1. In addition to the mechanical elements employed in FIGURE 1, this invention provides means for electro-magnetically controlling the welding current stream to cause the welding current stream to traverse and scan the contacting edge surfaces at the seam.

By controlling the welding current stream to cause it to scan the surfaces to be welded, the welding action is not limited, as in the prior art, solely to the spot heated by the peak of the current impulse, but, instead, the welding action is controlled and caused to take place over the entire surfaces of the contacting seam edge faces.

Moreover, by moving the welding current to scan the seam edge surfaces, the heating action of the weld current can be safely controlled both as to speed and current quantity. The fast traverse of the weld current stream on the seam edge surfaces shortens the time of heating and permits the use of a larger current quantity for welding, since the short heating time does not permit sufficient heat to accumulate to melt out the metal at the seam. The action is thus like the sweep of a hot welding brush between the two engaging edge surfaces, to melt the metal progressively along those surfaces so the molten metal may progressively coalesce and weld the seam edges together.

In order to cause the current stream to scan and heat the seam surfaces, electromagnetic means are provided to establish electromagnetic control flux fields to act upon the weld current stream as a movable conductor, and to move the weld current stream as a movable conductor through a predetermined path.

The electromagnetic means and the welding current stream act as an electric motor, the magnet being stationary and the current stream being movable. The direction of movement of the weld current stream depends upon the relation between the flux polarity and the current polarity; and the speed of reversal of movement depends upon the frequency of alternation of the control flux.

Where the metal being welded is relatively thin, so the width of the edge presented at the seam will be relatively narrow, the weld current stream section may be of sufficient diameter to extend across the full width of the seam surface area and thereby effect a complete weld along the entire area of the surface at the seam from the inner to the outer peripheral corner edge of the seam surfaces, under the influence of one set of electromagnetic flux fields.

Here illustrated is an application where the welded surfaces are butt welded. The same operation may be applied to lap welds where the area of the lapped surfaces is such that the weld current stream would be wide enough to cover the width of the area to be welded.

For such thicker wall sections, two co-ordinate flux fields are used, one field to reciprocate the weld current stream radially in and out on the seam surfaces, and the other flux field to reciprocate the weld current stream longitudinally on the seam surfaces.

The point that must be observed is that the control magnetic flux must be perpendicular to the welding current stream, so that a dynamo-electric reaction may be established between the control flux and the welding current stream.

By the fast reciprocation of the weld current stream over the seam surfaces, those surfaces are heated quickly and cooled quickly. The original metallurgical structure is thus substantially retained.

For optimum operation and results, the value of welding current supplied to the seam should be co-ordinated with the speed of movement of the tubing or skelp through the machine, the size of the material surface to be heated, the frequency of the control circuit, and the pressure between the surfaces to be welded.

The continuous weld thus formed will produce a thin seam layer of fine grain structure serving as a strong coherent metallic bonding material over the entire seam surfaces and strongly holding them together.

Thick Wall or Wide-Zone Welding

Where the material to be welded into a pipe is relatively thick, as, for example, more than one-eighth of an inch thick, the current stream may not be sufficiently wide or sufficiently distributed, over the width of the surface to be welded, to assure a complete weld from the inner to the outer edge of each surface at the seam.

In a thick-wall pipe, the prior art method of welding has produced results and conditions schematically illustrated in FIGURES 17 to 22, inclusive.

Figure 17:
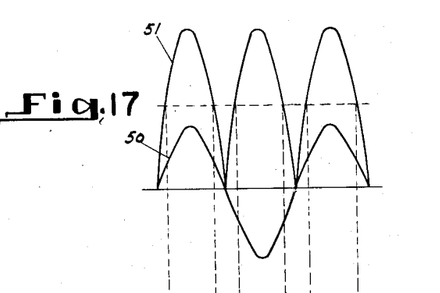
FIGURE 17 is a simple graph showing the relationship between the alternating current and the heating impulses.

FIGURE 17 shows the welding current represented by the solid-line sine wave 50, and the corresponding heating impulse effects represented by the waves 51, all above the zero base line.

Figure 18:
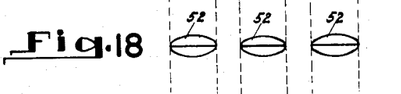
FIGURE 18 is a graph related to FIGURE 17 to illustrate the relative disposition of heated regions along a welded seam.

FIGURE 18 illustrates schematically the relation of several weld spot zones 52 to the heat impulse waves 51 and the current sine waves, under conditions which would separate and space the weld spots.

Figure 19:
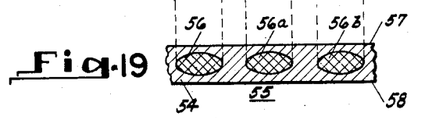
FIGURE 19 is a schematic sectional view taken longitudinally along a welded seam and showing the disposition of welded spots in a thick-wall pipe, made at a speed sufficiently high to space the welded spots from each other.

FIGURE 19 illustrates schematically an elevational view along a seam edge surface 54 of a thick-wall pipe 55, showing the disposition of a series of weld spots 56, 56-a and 56-b, as developed by a series of heat impulse waves 51, as in FIGURE 17. The weld spots 56, 56-a and 56-b are located intermediate the upper and the lower edges 57 and 58 of the seam surface 54, and are shown separated and spaced as they would be if the pipe were moved at a high speed past the welding electrodes used for that pipe. At a slower speed, the weld spots would be closer together or would even overlap lengthwise, depending upon the speed.

Figure 20:
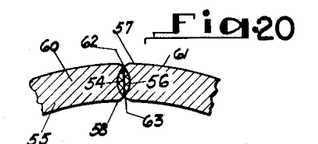
FIGURE 20 is a transverse sectional view across the seam illustrating how a central disposition of the weld zone fails to extend to both the inside and the outside peripheral edges.

A transverse view of the seam region, taken through a weld spot 56 along the seam, is shown in FIGURE 20, where two portions 60 and 61 of the pipe are joined at the seam by a weld spot 56 that does not extend vertically through the entire height of the seam. Consequently, two V-shaped notches 62 and 63 are formed lengthwise along the top and bottom edges of the weld spots in the seam, at the inner and the outer edges of the seam.

Figure 21:
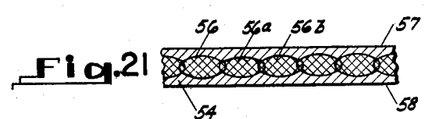
FIGURE 21 is a view similar to FIGURE 19, but showing the disposition of the weld spots in overlapping relation when the welded action is performed at slow speed.
Figure 22:
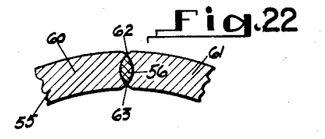
FIGURE 22 is a transverse sectional view across the weld seam on a pipe welded as in FIGURE 21, illustrating a failure, similar to FIGURE 20, to reach to both the inside and the outside peripheral edges.

The top and bottom edges of the weld spots, that constitute the apices of the notches, thus become stress concentration lines that tend to rupture the welds and to open up the seam. This situation obtains whether the weld spots are separated from each other due to high speed welding, as shown in FIGURE 19, or whether the weld spots overlap, due to slower welding, as shown in FIGURE 21. In the latter case, the seam edge surfaces are still not completely welded, but have the V-shaped notches along the inner and the outer edges of the seam, as shown in FIGURE 22, which indicates a structure similar to that of FIGURE 20.

Such V-shaped formations along the edges of a seam therefore constitute dangerous and destructive formations that tend to weaken and rupture a seam with an effective force that is entirely out of proportion to the relationship between the unwelded areas of the seam and the welded spot areas.

To eliminate this weakening influence, the seam surfaces must be welded over their entire areas from top to bottom edges of the seam. To accomplish and to assure such a complete weld, the welding current must be controlled to scan the entire edge surfaces at the seam, so the weld will be established over the entire surfaces. Such a scanning operation must involve, in part, a radial movement of the current stream, from a position across the upper edge of the seam to a position across the lower edge of the seam, in order to heat every part of the edge surfaces at the seam.

Figure 23:
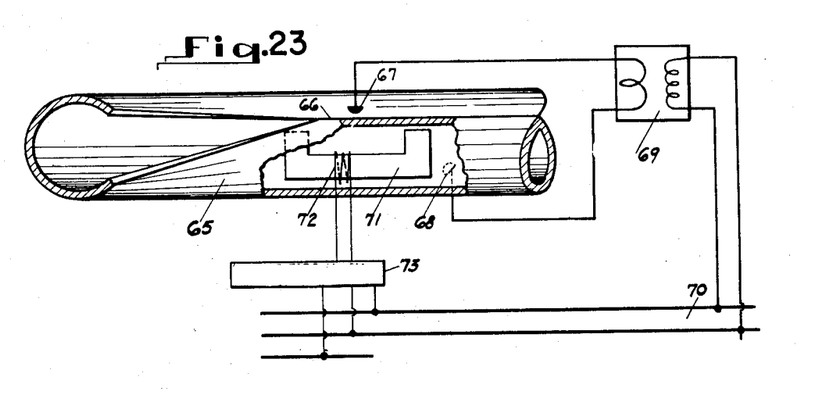
FIGURE 23 is a schematic diagram of a welding system modified according to this invention, to establish radial reciprocation of the welding current stream.

The radial part of the movement of the welding current stream is controlled by a system whose principles are shown in simple schematic form in the diagram of FIGURE 23. As shown, pipe 65 is to be welded along its seam 66 by a current stream between the two electrodes 67 and 68, connected to the secondary winding of a transformer 69 energized from an alternating current circuit 70 of standard commercial frequency, such as sixty cycles. An electromagnet 71 is disposed longitudinally along and adjacent the seam 66 to establish a control magnetic flux field in, and parallel to, the seam 66, to be perpendicular to the normal weld current path between the electrodes. By energizing the electromagnet 71 in one direction or the other, the weld current can be controlled to shift its position radially, from the inner peripheral edge of the seam to the outer peripheral edge of the seam.

The magnet 71 is energized by a coil 72 which is connected to be energized from a suitable source to provide flux fields of desired polarity and duration in the magnet 71.

The manner in which the magnet 71 controls the position of the weld current stream is illustrated in FIGURES 24 to 31, inclusive.

Figure 24:
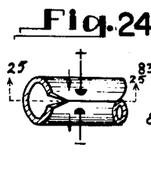

FIGURE 24 illustrates the direction of the weld current in a downward direction between the electrodes, corresponding to the positive current wave in the weld current circuit.

Figure 25:
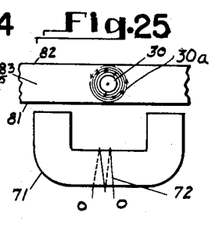

FIGURE 25 represents a schematic longitudinal and vertical elevation of the seam along and in the direction of the lines 25—25 of FIGURE 24, with the control magnet 71 adjacent and spanning the full welding zone extending on both sides of the electrode plane, and with the weld current represented by the heavy solid line circle 30 and its central dot representing an arrow point, indicating a positive current wave flowing toward the observer. The control magnet 71 is unenergized, and the current stream 30 is in the plane of the electrodes, and centralized in the middle of the seam width by its flux field 30–a.

When the electromagnet 71 is energized, as in FIGURE 26, by a negative wave of control current, while the weld current is positive, the weld current stream 30 is moved upward in the body of the pipe to the upper edge or corner 82 of the seam surface 83 that is to be welded to form the seam. FIGURE 26 illustrates how the magnet flux 71–a reacts upon the current flux 30–a, surrounding the weld current stream 30 to establish a motor force tending to move the current stream 30, as a movable conductor, upward away from the flux field 71–a set up by the magnet 71.

Figure 27:
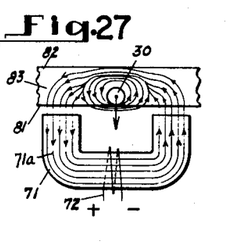

When the magnet flux field 71–a is reversed, by a positive control current impulse as in FIGURE 27, while the weld current is positive, as in FIGURE 27, the reaction between the magnet flux 71–a and the weld current flux 30–a is reversed from that in FIGURE 26 and the weld current stream 30 is forced downward to the lower edge 81 of the seam surface 83.

Figure 28:
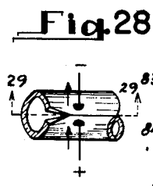
FIGURES 28 to 31, inclusive, are similar progressive views illustrating the effect of the control current magnetic flux upon the welding current stream during the negative wave of the welding current, in the system of FIGURE 23.
Figure 29:
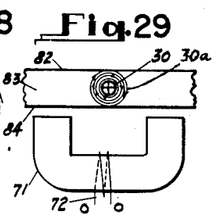

When the polarity of the welding current 30 reverses, as in FIGURE 28, the direction of the flux field 30–a around the weld current stream reverses, as in FIGURE 29, where the circle 30 now represents a negative weld current flowing away from the observer.

Figure 30:
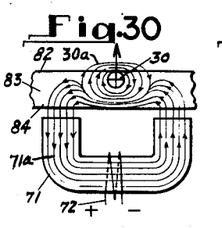
Figure 31:
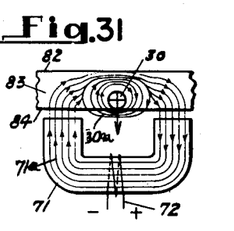

The reactions between the weld current flux 30–a and the flux field 71–a established by the electromagnet 71, as shown in FIGURES 30 and 31 are similar to the reactions shown in FIGURES 26 and 27, the reactions being such as to move the weld current stream in one direction or the other, to the corresponding edge of the surface to be welded to form the seam.

Thus, with electromagnetic means, generally as represented by the electromagnet 71 of FIGURES 23 to 31, the weld current stream 30 may be shifted radially from edge to edge through the surfaces 83 to be welded to form the seam.

The electromagnet 71 may be energized by alternating current of desired frequency to cause the radial reciprocation of the weld current stream. Or, the electromagnet 71 may be energized by direct current waves or pulses of appropriate polarities for appropriate time intervals while the current stream is being swept longitudinally in one direction or the other.

By other electromagnetic means, generally represented by the electromagnet structures 85 and 86 of FIGURES 32 to 36, inclusive, the weld current stream may be shifted, or reciprocated, longitudinally along the surfaces to be welded to form the seam.

In a thin-wall tube, the longitudinal reciprocation may be sufficient for a satisfactory weld if the weld stream forms a weld spot or area wide enough to extend between both corner edges of the seam surfaces to be welded as a butt weld. Similarly, a lap weld of thin material may be formed, where the width of the area of overlap is within the width of the weld spot or area that would be formed by the weld current stream as it is reciprocated.

In the case of a lap weld, the magnet position would have to be changed, of course, so the magnet flux would be perpendicular to the weld current stream, to establish the proper magnetomotive action.

In the case of a butt-weld between thick-wall edge surfaces of a pipe, where the width of the weld spot formed by the weld current stream is not co-extensive with the thickness of the wall or the width of the butt edge surface to be welded, the current stream should be moved to scan the entire surface area to establish a welding action over the entire area of the butt edge surface to be welded. To accomplish such scanning action, suitable electromagnetic means are provided to establish two-dimensional movements of the current stream in order to heat the entire butt edge surface area from inner corner edge to outer corner edge.

Such electromagnetic means establish proper cooperating magnetic flux fields to move the weld current stream in a predetermined path that will cause the weld current to traverse and heat the entire area presented to be welded, from inner to outer edge corners, and thus obviate the formation of V-shaped grooves with stress-concentration lines along the edges of the welded areas.

As indicated in FIGURES 24 to 31, the magnetic structure 71 establishes the radial in and out reciprocation of the current stream 30.

To establish the longitudinal reciprocation of the current stream, the two electromagnet structures 85 and 86 are employed, as illustrated in FIGURES 32 to 35.

Figures 39, 40:
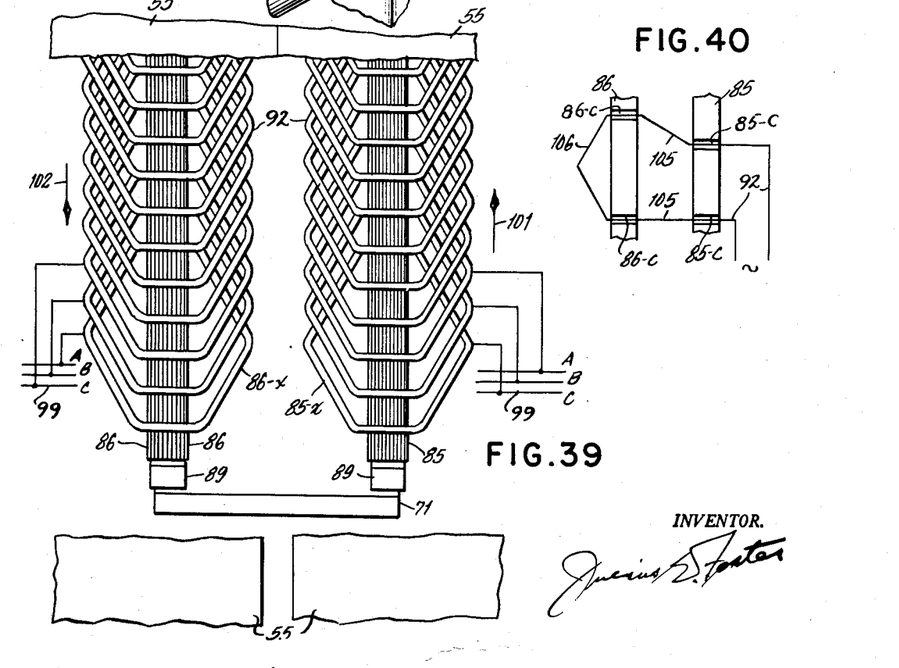
FIGURE 39 is a schematic view of the two stators showing the distributed winding arrangement to develop the oppositely rotating pole fluxes.
FIGURE 40 is a simple diagram of a single phase coil circuit showing one slot conductor displaced as may be necessary for the different phase rotations.

Each of the magnetic structures 85 and 86 of FIGURES 32 to 35, consists essentially of a stator 90 with external slots 91 to accommodate a set of polyphase windings 92, omitted from these figures for clearness, but shown in subsequent FIGURE 39.

As in a polyphase motor, the polyphase windings 92 develop a travelling or rotating magnetic field. Here, however, the field travels around the periphery of the stator. With a stator so constructed in a motor, the associated movable or rotatable member, corresponding to a rotor, would surround the stator and rotate around the stator. Such external rotor would have current-carrying conductors that would develop their own magnetic fields. The reaction between those magnetic fields of the movable conductors and the magnetic fields of the stator windings would cause side-wise movement of the current-carrying conductors of the rotor to establish mechanical rotation of the rotor around the axis of the stator.

Here, the weld current stream is the equivalent of the movable conductor and is similarly moved sidewise within the length of the controlled welding region, as predetermined by the design dimension of the stator alongside the path of the pipe seam, as the pipe progresses through the weld zone.

The magnetic stator structure 85 is designated to establish a clock-wise rotating field of two-poles. The winding layout and design of such a stator follows conventional theory. The stator is preferably built as a laminated structure with the number of slots and teeth to suitably accommodate the distributed winding layout. Here a two-pole stator is shown.

The stator should be as close as possible to the lower edge of the pipe seam, to keep the air gap small as possible, as in conventional motor design, to keep the required magnetizing current low for the stator.

The travelling magnetic flux field developed by the stator should be sufficient to substantially magnetize the pipe section moving through the weld zone, to move the current stream as may be necessary to follow a predetermined scanning pattern.

In the conventional motor, the quantity or amplitude of the magnetic flux field is computed as an adequate energy-transmitting medium, according to the voltage that must be generated to cause the required current flow and energy transfer.

Here, the amount of flux needed is not a function of the amount of energy required to be transferred. Here the amount of flux needed is determined by the permeability of the pipe or metal being welded, and the amount of flux necessary to establish a substantial magnetized condition in the pipe or metal being welded. The resistance of the weld current to movement is relatively small.

Figure 32:
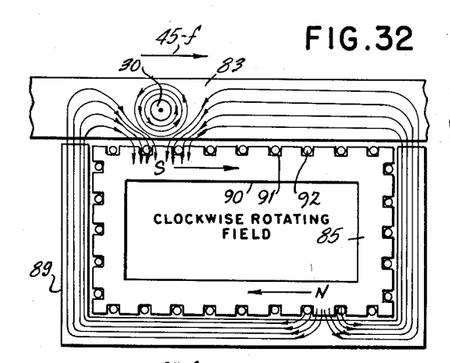
FIGURES 32 to 37, inclusive, are schematic views showing the effects of the control flux of the travelling or rotating fields on the weld current stream.

The manner in which the rotating magnetic flux field of the stator reacts on the magnetic flux of the weld current stream is shown in FIGURES 32 to 36. In FIGURE 32, the weld current stream is shown positive, flowing toward the observer. The windings on stator 85 are distributed to develop a flux field travelling clock-wise, as viewed, when energized with appropriate phase rotation from a suitable polyphase source. The reaction between the stator field and the weld current flux is such as to move the weld current to the right when a South pole flux reaches the weld current stream and continues to move around the periphery of the stator 85.

Figure 33:
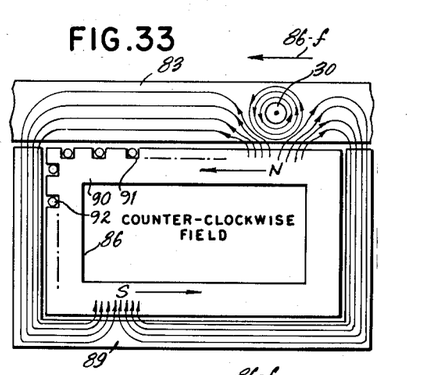

The windings on the other stator 86 are distributed to develop a flux field travelling counter-clockwise, that is, in the opposite direction relative to the field of stator 85. Therefore, when the weld current stream is still positive, as indicated in FIGURE 33, a travelling pole of opposite polarity, or North, is required in stator 86 to move the current stream to the left.

Figure 34:
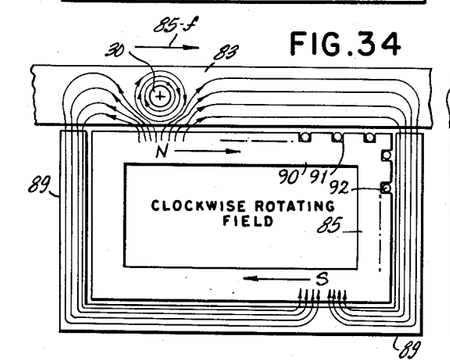
Figure 35:
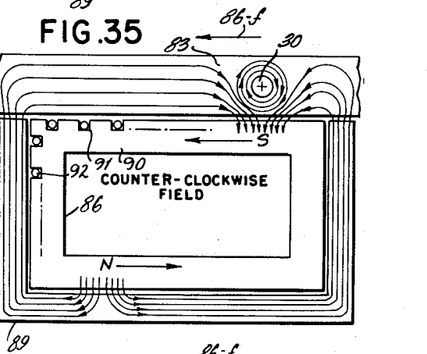

In FIGURES 34 and 35, the conditions are shown for a negative welding current. There, the North pole of the travelling field flux of stator 85 is required to shift the current stream to the right, and the South flux pole is required in stator 86 to move the current stream to the left.

By properly timing the location of the travelling field poles relative to the polarity of the weld current stream, the appropriate scanning movement of the weld current stream can be effected.

For convenience and simplicity of illustration, the stators are shown as two-pole structures. The peripheral circular span of each stator is therefore 360 electrical degrees. The linear portion of the stator, directly adjacent the weld zone, should encompass ninety electrical degrees. The remainder or back of the stator may have any mechanical disposition or shape that will be convenient. It will be equivalent electrically to 270 degrees. In order to keep a substantially closed magnetic circuit around each stator, to minimize the magnetizing current, a magnetic core 89 is closely fitted, with minimum or no air-gap, around the back of the stator over the inactive 270 degree part.

The action of the two counter rotating magnetic fields on the stators is therefore such as to reciprocate the weld current stream back and forth longitudinally in the weld zone.

Figure 36:
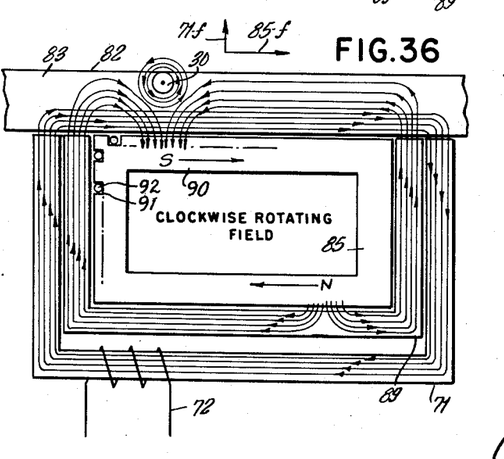

Such longitudinal reciprocating action by stators 85 and 86 may now be combined with the radial reciprocating action by the electromagnet 71, as shown in FIGURE 36, to cause the current stream section to follow any imposed scanning program to establish a corresponding scanning of the seam surfaces to be welded by the weld current stream.

The scanning action may be caused to follow a closed box pattern, that is, forward along one edge of the progressing seam and then radially shifted over to the other edge and back along such other edge to the original starting position of the current stream. Alternatively, the current stream may be swept back and forth along one seam edge, then radially shifted to the other edge and there shifted back and forth, thereby to weld both of the seam surfaces clear out to the edges.

In FIGURES 32 to 35, the arrows 85–$f$ and 86–$f$, above the weld current 30, indicate force effects of the moving field pole, and the consequent direction of movement of the weld current stream section, in each case.

In FIGURE 36, both scanning action fields are shown applied, as in normal operation. The effect previously shown in FIGURE 26 is now combined with the effect shown in FIGURE 32. The two force effects on the weld current stream are represented by the arrows 71–$f$ and 85–$f$. Thus the current stream section is moved to the upper edge 82 of the seam surfaces 83 by force 71–$f$ and then shifted to the right by force 85–$a$.

Figure 37:
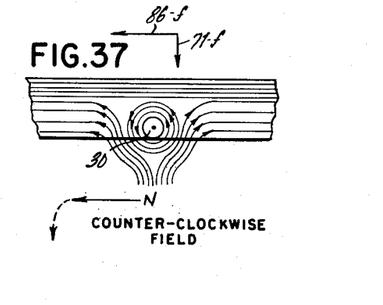

In FIGURE 37 the situation is shown for reversal of the flux from magnet 71 to bring the weld current down to the lower edge 81 of seam surfaces 83. Since this view is of stator 86, the force 86–$f$ is in the opposite direction from FIGURE 36. The weld current 30 is now on lower edge 81 and moved to the left. The polarity of the weld current is still the same as in FIGURE 36. This FIGURE 37 represents the combination of FIGURE 27 with FIGURE 33.

The other two conditions, not shown, would correspond to a negative weld current, moving away from the observer, as in FIGURES 34 and 35, respectively combined with FIGURES 30 and 31.

All of the conditions are now indicated for forcing the current stream 30 to either seam edge and then reciprocating the current to assure seam edge welding.

Figure 38:
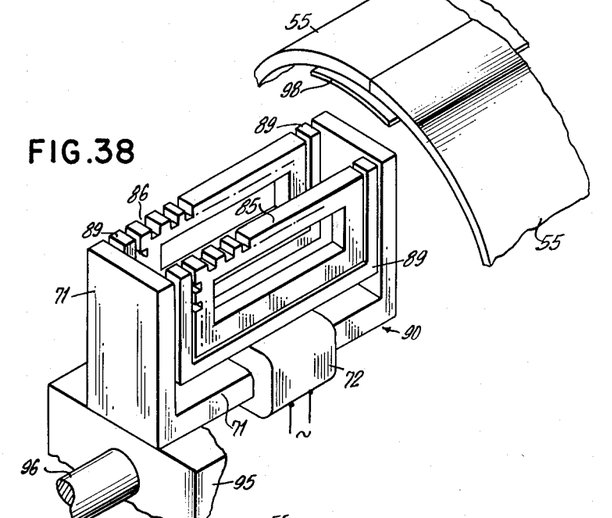
FIGURE 38 is a schematic perspective view of the magnetic core structures of the flux control assembly to be fitted into the pipe adjacent the weld zone.

In FIGURE 38, the various components of the welding apparatus are shown schematically, merely to illustrate the general arrangement and disposition. The phase windings of the two motor stators 85 and 86 are not shown, to simplify the illustration. As shown, the two motor stators 85 and 86 are parallel and disposed to extend axially in the pipe 55 that is to be welded. Each stator has a back core or armature 89, whose function as a flux return path is clear from FIGURES 32 to 36. The pipe 55 itself serves as an armature or flux return over the linear portion of the two stators, as is also clear from those figures.

The magnet 71 is of sufficient dimension to span the length of each stator 85 and 86. As previously indicated, the linear dimension of each stator should span the weld zone so the weld current can be shifted through an adequate weld stroke.

The magnetic flux-control assembly 90 including magnet 71 and the two stators 85 and 86 is preferably mounted on a supporting structure 95 to which a mandrel 96 is shown attached for controlling the position of the flux-control assembly adjacent the weld zone. To protect the insulation of the windings from hot metal droppings from the welded pipe, a cover shield 98 of non-magnetic stainless steel is supported above the stators, from the main supporting structure 95, by any suitable means, the details of which need not be shown.

In FIGURE 39, the parallel side-by-side arrangement of stator cores 85 and 86 is shown, within the pipe 55, with a distributed winding arrangement which is intended, however, merely to indicate a polyphase distribution. No specific distribution is intended. The excitation of the two sets of windings is indicated to be in reversed phase rotation as energized from a common source 99. The direction of travel of the rotating fields on stators 85 and 86 is indicated by the flux arrows 101 and 102.

In order to permit the two stators 85 and 86 to be placed close together, the end turns 85-x and 86-x between the two stators 85 and 86 may be obviated by straight connections 105 between appropriate slot conductors 85-c and 86-c in the two stators, as in FIGURE 40, and the appropriate end connections 106 made on the outer ends of the slot conductors, keeping in mind the proper phase relations and the relative electrical rotary spacing of the two stators to establish the relationships required as in FIGURES 32 to 35. As there indicated, the clock-wise South pole of stator 85 reaches the right end of the weld zone shortly before the North pole of stator 86 rises to the right end of the linear weld zone for its counter-clock-wise movement to shift the current stream to the left end of the weld zone.

This close disposition of the two stators is important since their travelling field poles are kept close to the plane of the seam surfaces where the effect on the weld current stream section is sought to be most effective.

Figure 41:
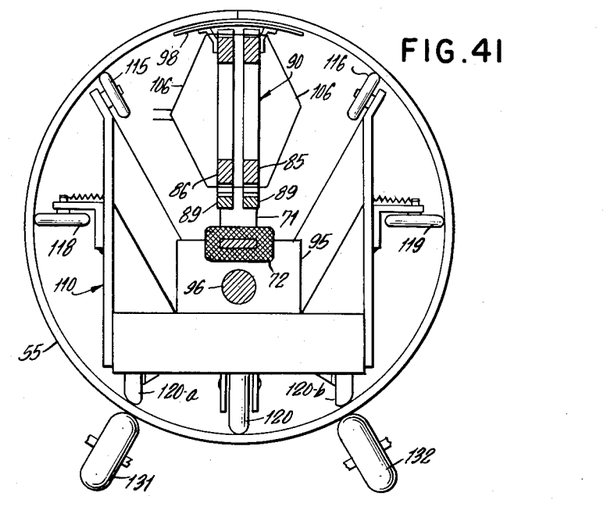
FIGURE 41 is a schematic end view, partly in elevation and partly in section, of the carriage to fit into the pipe to support the flux control assembly.

FIGURE 41 is an end view showing a schematic construction of a travelling carriage 110 relatively movable within the pipe 55, in order to hold the flux-control assembly 90 adjacent the weld zone.

The carriage 110 supports the two stators 85 and 86, with their flux-return cores 89, and the magnet structure 71 whose energizing coil 72 is shown. The two stators 85 and 86 are shown in close physical disposition with direct connections between slot conductors and with end turn connections on the outside of the double-core stator assembly. One phase coil connection is indicated, to show the same source may energize both sets of distributed windings.

To prevent the flux-control assembly 90 from touching and rubbing against the moving pipe 55, the supporting structure 95 is biased downwardly by two rollers 115 and 116 that ride the inner surface of the pipe 55 with proper dimensions and spacing adapted to the curvature of the pipe 55.

Two pressure-biased side wheels 118 and 119 provide side bracing for the support 95, while a set of wheels 120, 120-a and 120-b provide rolling support and upward spring bias to the support 95.

Two outer rollers 131 and 132 schematically represent components of the machine on which the pipe is supported and advanced through the welding zone.

In the preceding figures, the important feature of the invention has been shown to be the control of the weld current stream to cause that current stream section to scan the seam surfaces. By way of illustration one method of supplying the weld current to the pipe has been shown in FIGURE 1 as by rolling electrodes.

Figure 42:
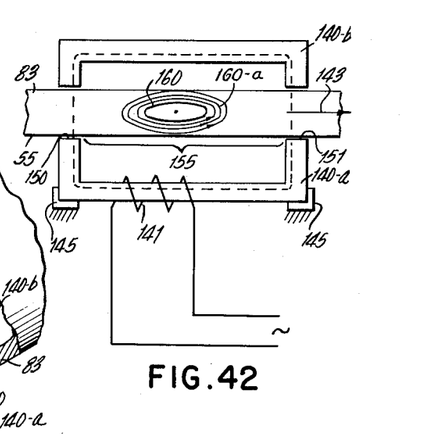
FIGURE 42 is a schematic view of a transformer core inductively related to the pipe to induce the welding current in the pipe.
Figure 43:
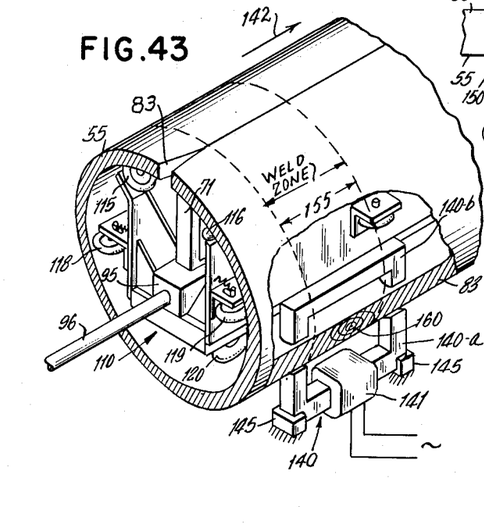
FIGURE 43 is a perspective view of the carriage supporting the flux-control assembly and the inner core of the transformer in proper position relative to the weld zone of the pipe.

In FIGURES 42 and 43 is shown a different method of providing the weld current to cross the seam surfaces.

As shown in FIGURE 42, a section of the pipe is arranged to serve as a closed single loop secondary of a transformer 140, so the welding current can be generated directly in the pipe by induction. The transformer 140 has two stationary core sections 140-a and 140-b and a primary winding 141 to be energized from an external A.C. source. The pipe 55 moves longitudinally in the direction of arrow 142, and moves progressively between the two transformer laminated core sections 140-a and 140-b, as indicated by arrow 143. The section 140-a carrying the primary winding 141 is on the outside of the pipe and is held stationary by suitable means 145 to match up with the inner core section 140-b. The other section 140-b is on the inside of pipe 55 and is supported on and held stationary by the carriage 110.

The inner core section 140-b is of higher magnetic permeability than the pipe material, so a major portion of the flux generated by winding 141 will traverse the inner core section 140-b rather than the pipe 55. In addition, the flux from winding 141 should be sufficient to substantially saturate the pipe section between the pole faces 150 and 151 at the ends of the outer core section 140-a. Such saturation of the pipe section will reduce its permeability still more, and thereby divert flux to the inner core section 140-b.

As the flux reverses through the two core sections 140-a and 140-b from excitation by winding 141, the cylindrical pipe section over the length 155, now held closed at the butting seam surfaces, constitutes a single turn closed loop secondary of the transformer. Consequently, a substantial secondary current 160 flows in such closed loop cylindrical pipe section.

The cross section of the current stream 160 will take a compressed or oval shape as in FIGURE 42 and would normally tend to centralize itself along a median plane by flux 160-a between the inner and the outer surfaces of the cylindrical pipe section. Where such induced secondary current crosses the seam surfaces, the current stream section will tend to centralize itself between the top and the bottom edges of the seam surfaces.

The flux-control assembly 90, with the magnet 71 and stator cores 85 and 86, then controls the induced current stream 160 in the same manner as previously described in controlling the current stream 30.

As indicated in FIGURE 43, the inside transformer core section 140-b is on the carriage 110. The core section 140-b is thus held in proper position to straddle the weld zone. The outer core section 140-a may be appropriately related to the mandrel to assure aligned positioning with respect to the inner core section 140-b. The two core sections 140-a and 140-b may be provided with spacing rollers to assure a small air gap between those two core sections and the pipe surfaces, to avoid frictional attrition.

For simplicity of illustration, the transformer 140 is shown located below the seam region of the pipe. The transformer 140 should preferably be located closer to the region of the seam surfaces.

Thus by means of the flux-control assembly adjacent the weld zones of a pipe cylinder or of two similarly abutting thick plates, the weld current between the two seam surfaces may be caused to scan those seam surfaces to assure a complete weld over the entire surfaces, without the presence of a cleft or unwelded edge region with a stress concentration zone that would weaken the weld.

The invention is obviously not limited to the structures shown, since they are intended to exemplify the teachings. The applications and the constructions may be varied within the spirit and scope of the invention as described and claimed or to be claimed.

What is claimed is:

1. In a welding system, for welding two ferrous metal elements along a seam at their engaging surface areas, the combination with a source of electrical energy and means energized therefrom to establish a welding current stream in said metal elements in a path to cross the seam between said two metal elements and through said seam and surface areas in a direction substantially perpendicular to said surface areas; of electro-dynamic means disposed adjacent and along the seam to be welded and operative to generate a moving magnetic flux field to react on the magnetic field induced by the welding current for electro-dynamically causing the flow section of said current stream to move along a predetermined dimension of the seam between the engaging surface areas, in order to scan said areas and to establish a welding action between said two metal elements over said scanned engaging areas.

2. A welding system as in claim 1, in which the electro-dynamic means comprises means for establishing an effectively reciprocating moving magnetic field force to act on said welding current stream, and a source of energy for said force-establishing means.

3. A welding system as in claim 1, in which the electro-dynamic means comprises a stator structure having windings distributed to set up a travelling magnetic field when energized from a polyphase source of voltage, the stator being disposed immediately adjacent an edge of the seam between the engaging surface areas so the travelling field can react on and move the welding current stream in a predetermined direction.

4. A welding system as in claim 3, in which the stator structure comprises two conjugate stators, with the windings of one stator serving to set up a travelling magnetic field effective in one direction relative to the welding current, and with the windings of the second stator serving to set up a travelling magnetic field effective in the reverse direction relative to the welding current.

5. A welding system as in claim 4, in which the stator windings are energized to cause the travelling magnetic field set up by the first stator to be of one polarity, and the travelling field set up by the second stator to be of the opposite polarity.

6. A welding system as in claim 4, in which the windings of the two stators are connected and energized to cause the magnetic field set up by one stator to travel around the stator in clockwise direction, and to cause the magnetic field set up by the second stator to travel around said second stator in counterclockwise direction, when both stators are viewed from the same axial point.

7. A welding system as in claim 6, in which each stator has an upper tooth-and-slot formation with its top contour plane relatively linear to enable each stator to be disposed longitudinally parallel to and adjacent a linear edge of the weld seam of the two engaging surface areas to be welded, each stator having windings in its upper slots connected serially with similar conjugate windings in slots along the lower edge of the other stator, whereby each set of upper windings and conjugate lower windings will operate to generate separate moving magnetic field poles of opposite polarity progressively moving in reverse rotational directions on the peripheries of the two stators.

8. In a welding system for welding two thick ferrous plate sections over a predetermined seam of juxtaposed surface areas, the combination with a source of welding energy and welding electrodes connected to said source of energy and adapted to engage the plate sections at opposite directions from the plane of said seam but on the same side of a medial line through the seam to supply the welding current to said plates for transmission across the seam; of electro-magnetic means disposed on the opposite side of said medial line and operative to establish a magnetic flux within the plate sections adjacent the seam to generate a force to move the welding current stream section in a first dimensional direction of the seam area; and co-operating electro-magnetic means likewise disposed on said opposite side of said medial line and operative to establish a traveling magnetic field to react upon the welding current stream and to move such current stream in a predetermined dimensional direction transverse to said first dimensional direction.

9. A welding system for welding two ferrous metal plates at a seam area defined by engaging surface areas of the plates, comprising electrode means engaging the metal plates on opposite sides of one edge of the seam area to enable a current to flow from one electrode to the other electrode through a path transverse to the seam area;

and electro-magnetic means disposed adjacent the other edge of the seam area and spaced from the electrodes by the body thickness of at least one of the plates, said electro-magnetic means serving, when energized, to generate magnetic flux fields through the seam surface regions in directions to react upon a welding current flowing between the two electrodes and through the seam surface areas.

10. A welding system for progressively welding two butting seam surface areas of an open cylinder of ferrous material, comprising means for supplying a welding current to the cylinder on its outer surfaces to cross the seam, and electro-magnetic means disposed entirely within the cylinder and adjacent the seam for generating and applying magnetic fields entirely from the under side surfaces of the cylinder body to control the welding current stream by causing said current stream to scan the butting seam surface areas and to establish heat welding action over the entire areas of said butting seam surfaces.

11. A welding system, as in claim 10, in which the electro-magnetic means include means for generating magnetic fields to move the current stream section radially inward and outward on the butted seam surfaces, and also means for generating magnetic fields to move the current stream section longitudinally forward and backward on the butted seam surfaces.

12. In a welding system for forming a pipe by seam-welding a cylinder of ferrous material along a longitudinal dimension by a welding current caused to flow across the seam, as the cylinder is moved longitudinally past a welding gap or region spanned by a pair of current-supply electrodes;

the combination with said cylinder, a supply source of said welding current to supply the welding current to said cylinder, of electro-magnetic means disposed adjacent the welding region between the current-supply electrodes, to generate a magnetic field to be effective to react electro-dynamically on the welding current stream that traverses the cylinder portion across the weld seam passing progressively through said welding region;

a carriage to support said electro-magnetic means;

mechanical biassing means to physically bias said electro-magnetic means from the inner surface of the cylinder section that moves progressively into said welding region, to hold to a minimum the air-gap dimension between the electro-magnetic means and said inner surface of said section of the cylinder;

and a mandrel secured to said carriage and extending out of the cylinder to a region where the mandrel is accessible so it may be manipulated and fixedly secured and anchored to adjustably and selectively position the electro-dynamic means relative to said welding gap.

13. The method of seam welding two metallic members to each other over defined engaging surface areas by electric resistance heating effect of a current supplied to cross the engaging surface areas, which consists in supplying the current to the two metallic members at points adjacent but on opposite sides of one seam edge to thereby determine the terminal points of a current path through and transverse to the engaging surface areas at the seam;

and generating magnetic flux fields at and to move along a selected longitudinal region of the opposite seam edge with such fields of appropriate polarity to react on the magnetic flux field of the welding current in order to cause the welding current stream section to shift and move through a predetermined path relative to the seam area to thereby heat and weld the engaging surface areas at the seam.

14. Welding apparatus for seam welding the abutting edges of a longitudinal cleft in a pipe blank, comprising means for compressing a pipe blank to close the cleft;

means for moving the pipe blank longitudinally and progressively through the welding zone;

guide means to extend into the cleft of a pipe blank to confine the cleft to a predetermined path of movement as the pipe blank is moved through the welding apparatus;

electrode means positioned to engage a pipe blank on its outer surface on opposite sides of the cleft to locate and define a welding zone to be traversed by the pipe blank throughout the progressive movement of the pipe blank through the welding apparatus, said electrodes serving to transmit a welding current across the cleft and through the abutting edges of the blank from the outside surface of the blank;

and electro-magnetic means disposed within the pipe blank and under the electrode means for generating and disposing magnetic fields in the pipe blank throughout the welding zone to effect electro-magnetic reaction between such magnetic fields and the welding current stream crossing the cleft.

15. Welding apparatus as in claim 14, including, in addition, a support for the electro-magnetic means;

a carriage for said support, the carriage being longitudinally movable within a pipe blank;

and means for positioning the carriage to locate the electro-magnetic means on said support in appropriate position adjacent the under side of the weld zone to define the region of reaction between the electro-magnetic means and the weld current stream.

16. Welding apparatus, as in claim 15, in which the carriage includes rolling elements to ride on the inside wall surface of a pipe blank being advanced through the apparatus;

and in which the support for the electro-magnetic means includes rolling spacer elements to hold the electro-magnetic means spaced from the pipe blank by a predetermined minimum air-gap, to prevent rubbing between the pipe blank and the adjacent flux-directing surfaces of the electro-magnetic means.

17. In a welding system, for welding two ferrous metal elements along a seam at their engaging surface areas, the combination with a source of electrical energy and electrodes connected to said source and engaging said metal elements to establish a welding current stream in said metal elements in a path to cross the seam between said two metal elements and through said seam and surface areas in a direction substantially perpendicular to said surface areas;

of electro-dynamic means disposed adjacent the seam for generating a moving magnetic flux field for electro-dynamically causing the flow section of said current stream to move along a predetermined elongate dimension of the seam between the engaging surface areas, and for generating a static magnetic flux field for electro-dynamically shifting the flow section of said current stream towards one edge region of the seam during such movement of the moving magnetic flux field, in order to scan said areas and establish a welding action between said two metal elements over said scanned engaging areas.

18. A welding system for welding two ferrous metal bodies at a seam area defined by engaging surface areas of the bodies, comprising electrode means engaging the metal bodies on opposite sides of the seam area to enable a welding current to flow from one electrode to the other electrode through a path transverse to the seam area;

and electro-magnetic means disposed adjacent one edge of the seam area, said electro-magnetic means including means serving, when energized, to generate one magnetic flux field moving through the seam surface regions in a direction to react in one direction upon the welding current stream section flowing between the two electrodes and through the seam surface areas, and said electro-magnetic means including means serving, when energized, to generate a second magnetic flux field to react on the welding current stream section in a second direction.

19. A welding system for welding two members of ferrous material over their engaging surface areas to constitute a seam, said system comprising means for causing a welding current stream to flow from one member to the other through the seam surfaces;

electro-magnetic means disposed adjacent the seam for generating a moving flux field to react upon and move the welding current stream section in a forward direction through a predetermined path;

and auxiliary electro-magnetic means disposed adjacent the seam to generate a static magnetic flux field selectively along one edge of the seam to shift the welding current stream section toward the other edge of the seam.

20. In a welding system, for welding two ferrous metal elements along a seam at their engaging surface areas, the combination with a source of electrical energy and electrodes connected to said source and engaging said metal elements to establish a welding current stream in said metal elements in a path to cross the seam between said two metal elements and through said seam and surface areas in a direction substantially perpendicular to said surface areas;

of electro-dynamic means disposed adjacent the seam for generating a moving magnetic flux field for electro-dynamically causing the flow section of said current stream to move along a predetermined dimension of the seam between the engaging surface areas, in order to scan said areas and to establish a welding action between said two metal elements over said scanned engaging areas.

References Cited in the file of this patent

UNITED STATES PATENTS

| | | |
|---|---|---|
| 1,557,976 | Brown et al. | Oct. 20, 1925 |
| 1,763,098 | Louis | June 10, 1930 |
| 2,086,305 | Sessions | July 6, 1937 |
| 2,139,211 | Sessions | Dec. 6, 1938 |
| 2,181,445 | Adams | Nov. 28, 1939 |
| 2,794,108 | Park | May 28, 1957 |
| 2,882,384 | Foster | Apr. 14, 1960 |